US007948650B2

(12) United States Patent
Takada et al.

(10) Patent No.: US 7,948,650 B2
(45) Date of Patent: May 24, 2011

(54) PRINTER-PLOTTER

(75) Inventors: Masanori Takada, Tomi (JP); Tadanori Ipponyari, Tomi (JP); Eiji Miyashita, Tomi (JP); Tetsuharu Ikeda, Tomi (JP); Akio Kobayashi, Tomi (JP)

(73) Assignee: Mimaki Engineering Co., Ltd., Nagano (JP)

( * ) Notice: Subject to any disclaimer, the term of this patent is extended or adjusted under 35 U.S.C. 154(b) by 608 days.

(21) Appl. No.: 12/055,214

(22) Filed: Mar. 25, 2008

(65) Prior Publication Data

US 2008/0239332 A1 Oct. 2, 2008

(30) Foreign Application Priority Data

Mar. 30, 2007 (JP) ................................ 2007-090535

(51) Int. Cl.
*H04N 1/04* (2006.01)

(52) U.S. Cl. .......... 358/1.3; 358/474; 358/505; 358/472

(58) Field of Classification Search .................. 358/1.3, 358/474, 505, 472
See application file for complete search history.

(56) References Cited

U.S. PATENT DOCUMENTS 6,194,859 B1 * 2/2001 Everman et al. .......... 318/568.2

FOREIGN PATENT DOCUMENTS

| | | |
|---|---|---|
| JP | 7-256960 | 10/1995 |
| JP | 9-66698 | 3/1997 |

* cited by examiner

*Primary Examiner* — Houshang Safaipour
(74) *Attorney, Agent, or Firm* — Ditthavong Mori & Steiner, P.C.

(57) ABSTRACT

A printer-plotter includes a guide rail, a first head, a second head, a driving device, a first connecting mechanism and a second connecting mechanism. The guide rail extends in a longitudinal direction. The first head is supported by the guide rail and movable along the longitudinal direction. The second head is supported by the guide rail and movable independently of the first head along the longitudinal direction. The driving device includes a driving force transmitting member and a driving mechanism configured to move the driving force transmitting member. The first connecting mechanism is configured to detachably connect the first head to the driving force transmitting member. The second connecting mechanism is configured to detachably connect the second head to the driving force transmitting member.

12 Claims, 7 Drawing Sheets

PRINTER-PLOTTER

CROSS-REFERENCE TO RELATED APPLICATIONS

The present application claims priority under 35 U.S.C. §119 to Japanese Patent Application No. 2007-090535, filed Mar. 30, 2007, entitled "Printer-Plotter Apparatus." The contents of this application are incorporated herein by reference in their entirety.

BACKGROUND OF THE INVENTION

1. Field of the Invention

The present invention relates to a printer-plotter.

2. Discussion of the Background

Printer is an apparatus for printing on a surface of a sheet-like medium by, for example, ejecting ink droplets from a printer head (inkjet head) while moving the printer head in anteroposterior and lateral directions (horizontally) relative to the sheet-like medium. Plotter is an apparatus for conducting the cutting process relative to a sheet-like medium by moving a cutting head in anteroposterior and lateral directions relative to the sheet-like medium while holding a cutter of the cutting head in contact with the sheet-like medium. For moving each of the heads of these apparatuses in the anteroposterior and lateral directions relative to the sheet-like medium, there is known an arrangement in which the head is supported by a guide rail extending in the lateral direction above the medium such that the head is movable in the lateral direction along the guide rail and the sheet-like medium is fed in the anteroposterior direction. There is also known an arrangement in which the sheet-like medium is fixed and supported on a flat plate and a guide rail which supports the head movably in the lateral direction moves in the anteroposterior direction above the sheet-like medium which is fixed as mentioned above.

There is also known an apparatus including a printer head and a cutting head which are supported on a guide rail so that the apparatus has functions as a printer in addition to a plotter (a plotter with print function). For example, Japanese Patent No. 3333312 and Japanese Patent No. 3645012 disclose such an apparatus. The contents of these patents are incorporated herein by reference in their entirety. By using such a plotter with print function, the space and the cost can be reduced as compared to a case using separately a printer and a plotter.

In the plotter with print function as disclosed in the aforementioned patent documents, the cutting head is attached to a belt which is driven by driving force of an electric motor similarly to a conventional plotter so that the cutting head is moved in the lateral direction according to the movement of the belt. In addition, a printer head is detachably attached to the cutting head which is moved in the lateral direction according to the movement of the belt. When the printer head is detached from the cutting head, the printer head is connected to a fixing member at an end of the guide rail so that the printer head is held not to move. During cutting process relative to a sheet-like medium by this plotter with print function having the aforementioned structure, the printer head is separated from the cutting head and is fixed to the fixing member so that only the cutting head is moved in the lateral direction. During printing process relative to a sheet-like medium, the printer head is detached from the fixing member and is connected to the cutting head so that the printer head is moved together with the cutting head in the lateral direction.

According to the plotter with print function having the aforementioned structure, both two heads are connected and are thus moved together during the printing process. For the movement, large belt driving force is required and an electric motor for driving the belt is thus required to have a large capacity, thus leading to increase in size and cost of the apparatus. Further, since the printer head is connected directly to the cutting head during the printing, ink droplets ejected from the printer head for printing may adhere to the cutting head so that the cutting head may be contaminated. Particularly when a solvent ink is used for printing, coatings of electric wires and harnesses for transmitting power and control signals to electric parts in the cutting head may be dissolved due to the adhesion of the solvent ink, leading to operation error of the cutting head. It should be noted that if the coatings of the electric wires and harnesses are made of a material having ink resistance, there is a problem of high cost of production of the apparatus because such a material is expensive.

SUMMARY OF THE INVENTION

According to one aspect of the present invention, a printer-plotter includes a guide rail, a first head, a second head, a driving device, a first connecting mechanism and a second connecting mechanism. The guide rail extends in a longitudinal direction. The first head is supported by the guide rail and movable along the longitudinal direction. The second head is supported by the guide rail and movable independently of the first head along the longitudinal direction. The driving device includes a driving force transmitting member and a driving mechanism configured to move the driving force transmitting member. The first connecting mechanism is configured to detachably connect the first head to the driving force transmitting member. The second connecting mechanism is configured to detachably connect the second head to the driving force transmitting member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
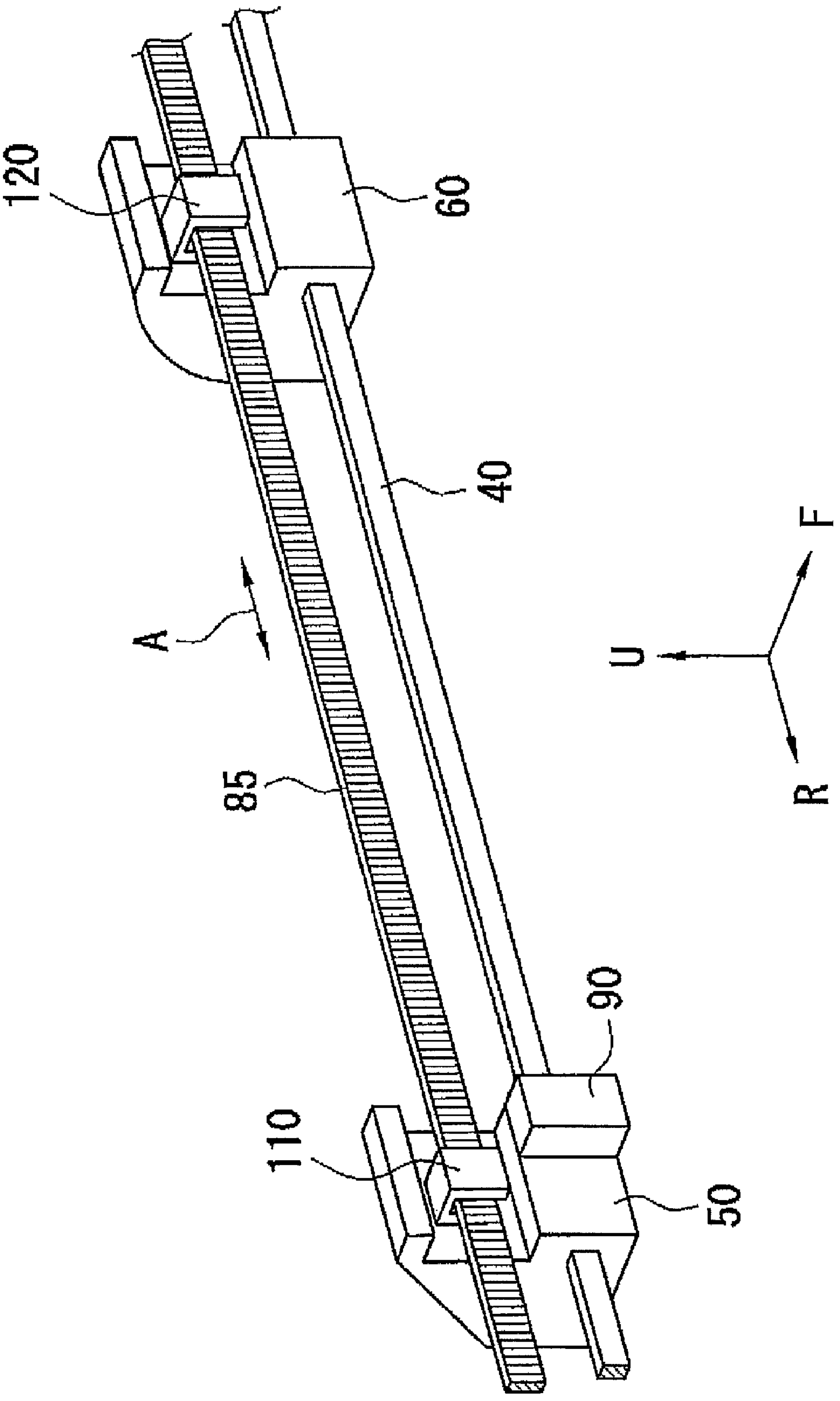
FIG. 1 is a perspective view schematically showing the structure of the operational principle of heads of a printer-plotter according to an embodiment of the present invention.

The embodiments will now be described with reference to the accompanying drawings, wherein like reference numerals designate corresponding or identical elements throughout the various drawings. It should be noted that the directions of arrows F, R, U marked in the drawings are forward, rightward, upward in the following description, respectively.

Shown in FIG. 1 are a guide rail 40, a cutting head 50 and a printer head 60 (sometimes called "inkjet head") which are attached to the guide rail 40 movably in the lateral direction, and a driving belt 85 which are components of a printer-plotter. As will be described below, the printer-plotter includes a platen on which a sheet-like medium as a subject to be cut by the cutting head 50 or a subject to be printed by the printer head 60 is put, and a feeding mechanism for feeding the sheet-like medium put on the platen in the anteroposterior direction. The guide rail 40 extends in the lateral direction above the platen. The cutting head 50 and the printer head 60 are attached to the guide rail 40 such that they are movable in the lateral direction independently. The driving belt 85 extends above and in parallel with the guide rail 40. As will be described later, the driving belt 85 is an endless ring-like belt and is wound around driving and driven pulleys, which are disposed right and left ends, to extend therebetween. As the driving pulley is rotated by an electric motor or the like, the driving belt 85 is moved in the lateral direction as shown by arrows A in FIG. 1.

Attached to the front surface of the cutting unit 50 is a spray unit 90 for applying a coating agent to form a coating layer on a surface of the sheet-like medium before the cutting process by the cutting unit 50.

Figure 7B:
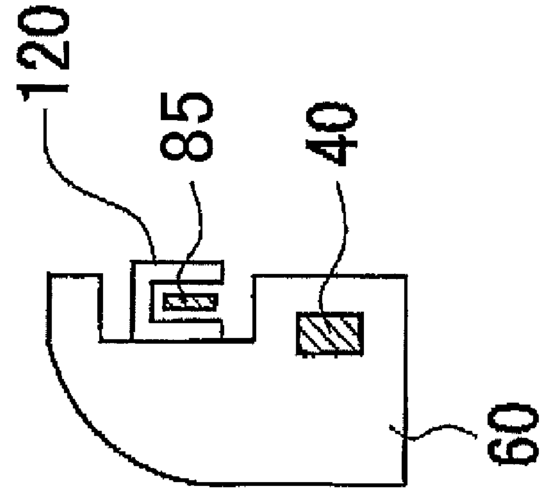
FIGS. 7A and 7B are cross-sectional view of connecting mechanisms.
Figure 7A:
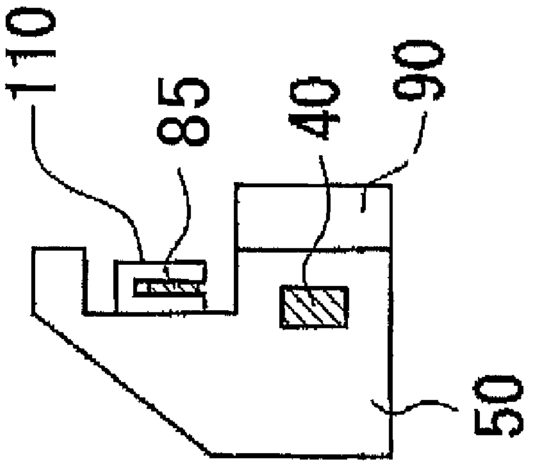

The cutting head 50 is provided with a cutting head connecting mechanism 110 which can clamp the driving belt 85 to connect to the driving belt 85, while the printer head 60 is provided with a printer head connecting mechanism 120 which can clamp the driving belt 85 to connect to the driving belt 85. For making it easily understandable, the structure is schematically shown in FIG. 1. Specific structure will be described later with reference to FIG. 3 through FIG. 5. Each of the cutting head connecting mechanism 110 and the printer head connecting mechanism 120 is adapted to select its state between a state where the connecting mechanism clamps the driving belt 85 to connect to the driving belt 85 as shown in FIG. 7A and a state where the connecting mechanism releases the driving belt 85 to separate from the driving belt 85 as shown in FIG. 7B.

Therefore, during the cutting process (cutout process or the like) relative to the sheet-like medium by the cutting head 50 or during the process for coating the surface of the sheet-like medium by the spray unit 90 attached to the front surface of the cutting head 50, the cutting head 50 is connected to the driving belt 85 by the cutting head connecting mechanism 110 clamping the driving belt 85 and the cutting head 50 is controlled to travel along the guide rail 40 in the lateral direction by controlling the rotation of the driving pulley. During this, the feeding of the sheet-like medium in the anteroposterior direction by the feeding mechanism is also controlled in combination with the control of the rotation of the driving pulley. In this state, a cutter (not shown) attached to the lower surface of the cutting head 50 is used to conduct intended cutting process relative to the sheet-like medium.

On the other hand, during the printing relative to the sheet-like medium by the printer head 60, the printer head 60 is connected to the driving belt 85 by the printer head connecting mechanism 120 clamping the driving belt 85 and the printer head 60 is controlled to travel along the guide rail 40 in the lateral direction by controlling the rotation of the driving pulley. During this, the feeding of the sheet-like medium in the anteroposterior direction by the feeding mechanism is also controlled in combination with the control of the rotation of the driving pulley. In this state, ink droplets are ejected from an inkjet device attached to the lower surface of the printer head 60 to conduct intended printing on the sheet-like medium.

Figure 2:
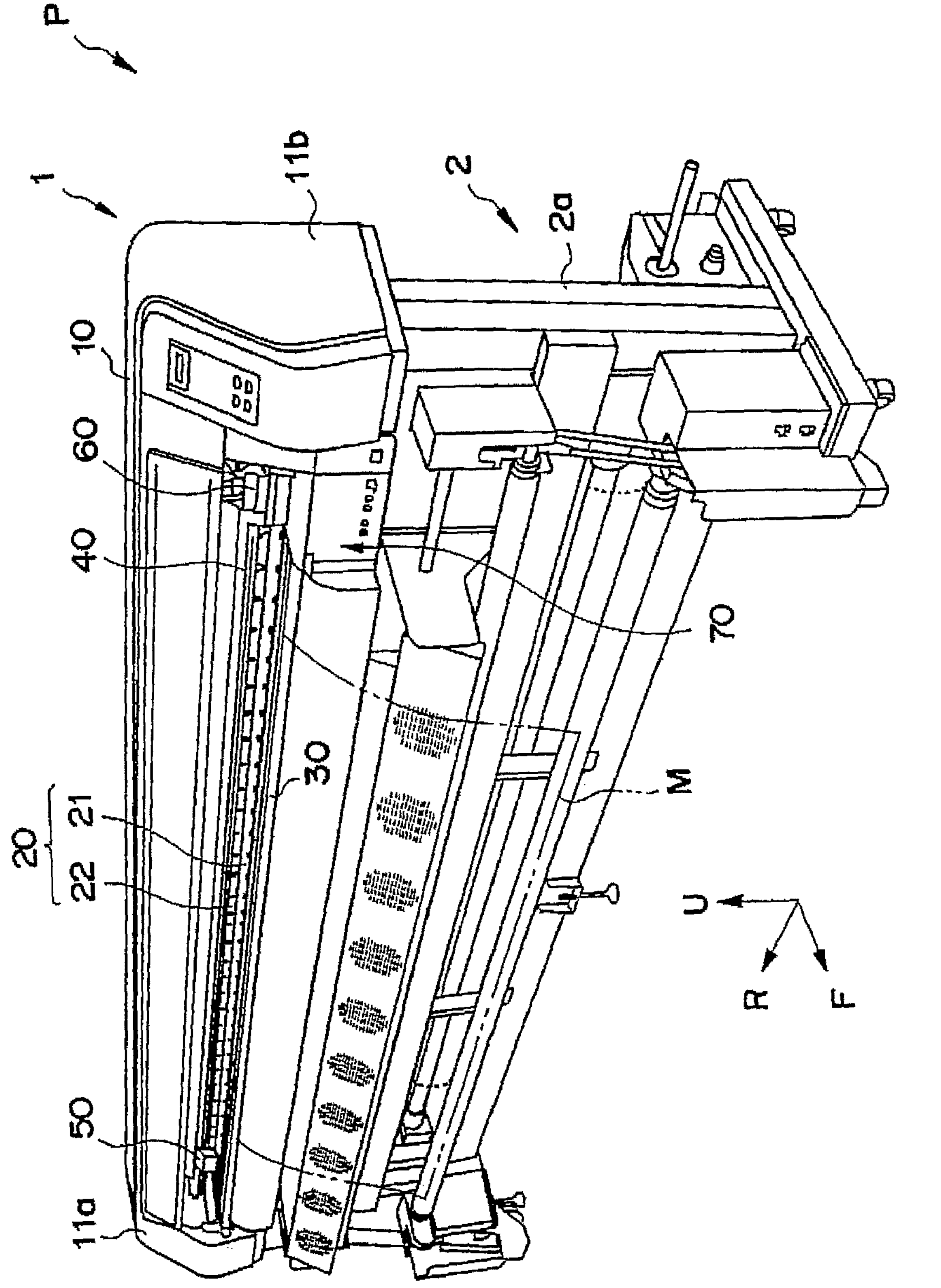
FIG. 2 is a perspective view showing the appearance of the printer-plotter according to the embodiment of the present invention.

Hereinafter, the specific structure of the printer-plotter having the aforementioned structure of operational principle will be described with reference to FIG. 2 through FIG. 4. A printer-plotter of which entire appearance is shown in FIG. 2 includes a main unit 1 for conducting a predetermined action such as printing to a sheet-like medium M such as a roll of paper and a supporting unit 2 having a pair of right and left legs 2*a* by which the main unit 1 is supported. The main unit 1 includes a body 10 fixed to the upper ends of the legs 2*a*, a feeding mechanism 20 for feeding the sheet-like medium M in the anteroposterior direction, a platen 30 for supporting the sheet-like medium M, a guide rail 40 extending in the lateral direction above the platen 30, a cutting head 50 and a printer head 60 which are supported by the guide rail 40 and are movable along the guide rail 40 in the lateral direction.

The body 10 has left and right side walls 11*a*, 11*b*. As seen from FIG. 3 showing its internal structure, the left and right ends of the guide rail 40 are connected to and supported by the side walls 11*a* and 11*b*, respectively so that the guide rail 40 extends in the lateral direction between the side walls 11*a* and 11*b*. The feeding mechanism 20 includes pairs of feeding rollers 21 and press rollers 22 which are disposed on a front side of the apparatus so that the pairs are aligned in the lateral direction. Each pair includes the feeding roller 21 and the press roller 22 as a lower roller and an upper roller which are rotatable in both the normal and reverse directions about respective rotary shafts extending in the lateral direction. In the state where the sheet-like medium M is inserted between the feeding rollers 21 and the press rollers 22, the feeding rollers 21 are rotated by an electric motor and the press rollers 22 are also rotated according to the rotation of the feeding rollers 21, whereby the sheet-like medium M is fed in the anteroposterior direction. The platen 30 is disposed between the left and right side walls 11*a* and 11*b* and is provided on its upper surface with a supporting surface 30*a* for horizontally supporting the sheet-like medium M. The supporting surface 30*a* is provided with a number of holes formed therein in which negative pressure can act. Therefore, the sheet-like medium M is sucked to the supporting surface 30*a* by the negative pressure so that the sheet-like medium M can be securely held on the supporting surface 30*a*.

The cutting head 50 includes a carriage 51 which is attached to and movable along the guide rail 40 in the lateral direction, a cutter holder 52 which is attached to the carriage 51, and a cutting head connecting mechanism 110 disposed within the carriage 51. The cutter holder 52 is supported such that the cutter holder 52 is movable in the vertical direction relative to the carriage 51 by a vertical movement mechanism (not shown). By controlling the operation of the vertical movement mechanism, the position in the vertical direction of the cutter 53 can be adjusted. A cutter 53 can be detachably attached to a lower end of the cutter holder 52 and has a blade at its lower end for cutting the sheet-like medium M. The cutter 53 is supported by the cutter holder 52 such that the cutter 53 is rotatable in the normal and reverse directions about a rotary shaft which extends in the vertical direction. Connected to the cutting head 50 are electric wires or harnesses which extend from the main unit to transmit power and signals for controlling the operation of the aforementioned vertical movement mechanism, but not shown.

The printer head 60 includes a carriage 61 which is attached to and movable along the guide rail 40 in the lateral direction, and a plurality of printer head modules 62 which are disposed on the lower end side of the carriage 61 and are aligned in the lateral direction. Each printer head module 62 is provided with a number of ink ejection holes formed in its lower surface so that the printer head modules 62 can eject ink droplets of different colors, respectively. The ink ejection holes of each module 62 face to the supporting surface 30*a* of the platen 30 in the vertical direction. As the sheet-like medium M is put on the platen 30, ink droplets are ejected from the ink ejection holes to the surface of the sheet-like medium M to conduct intended printing. Connected to the printer head modules 62 are tubes for supplying inks to ink passages from the ink storage portions (not shown) of the cartridge type. Also connected to the modules 62 are electric wires or harnesses for supplying electric power and signals for controlling the ink ejection. The ink storage portions may be mounted on the body 10 or on the carriage 61.

Below a right end portion of the guide rail 40, the main unit (the body 10) is provided with a maintenance device 70. The maintenance device 70 includes a stage 70*a* which is movable in the vertical direction and an anti-drying member 71 mounted on the upper surface of the stage 70*a*. The anti-drying member 71 is made of fabric or sponge having moisturizing property. As the printer head 60 is moved to the right end portion of the guide rail 40, the stage is automatically moved upward so that the lower surface of the head module 62 is covered by the anti-drying member 71 to close the ink ejection holes. As the ink ejection holes are closed, the inks around the ink ejection holes are blocked from being exposed to ambient air, thereby preventing the clogging of the ink ejection holes 62*a* due to drying of inks and thus keeping the ink ejection performance.

The aforementioned heads 50, 60 are moved along the guide rail 40 in the lateral direction to conduct intended cutting process and intended printing process. A head driving device 80 for moving the heads 50, 60 in the lateral direction is arranged in the body 10. The head driving device 80 includes driving and driven pulleys 81, 82 which are positioned above the right and left end portions of the guide rail 40, a driving mechanism composed of an electric motor 83 (for example, a stepping motor or a servomotor) for rotating the driving pulley 81, a driving belt 84 (driving force transmitting member) composed of an endless belt which is wound around the pulleys 81 and 82 to extend therebetween. The driving belt 84 is a synchronous belt and the pulleys 81, 82 are both synchronous pulleys so as to prevent slippage of the belt. In the driving device 80, the driving belt 85 can be controlled to move in the lateral direction as shown by arrows in FIG. 3 by controlling the drive of the electric motor 83 to rotate the driving pulley 81. It should be noted that the driving belt 85 is a synchronous belt and the pulleys 81, 82 are both synchronous pulleys so as to prevent slippage of the belt.

The heads 50, 60 are supported by the guide rail 40 such that the heads 50, 60 are movable in the lateral direction independently from each other. To enable the respective heads 50, 60 to be controlled to independently travel in the lateral direction, the cutting head connecting mechanism 110 for detachably connecting the cutting head 50 and the driving belt 85 is disposed on the cutting head 50 and a printer head connecting mechanism 120 for detachably connecting the printer head 60 and the driving belt 85 is disposed on the printer head 60, as described above.

Figure 4A:
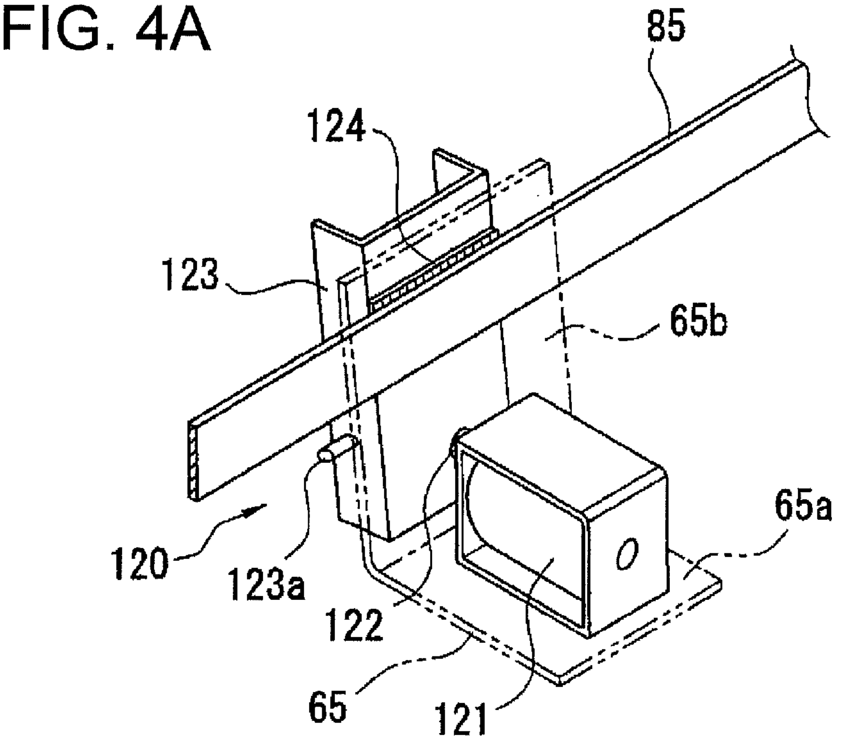
FIGS. 4A and 4B are perspective views showing a connecting mechanism for connecting the cutting head or the printer head and a driving belt in the printer-plotter according to the embodiment of the present invention.
Figure 4B:
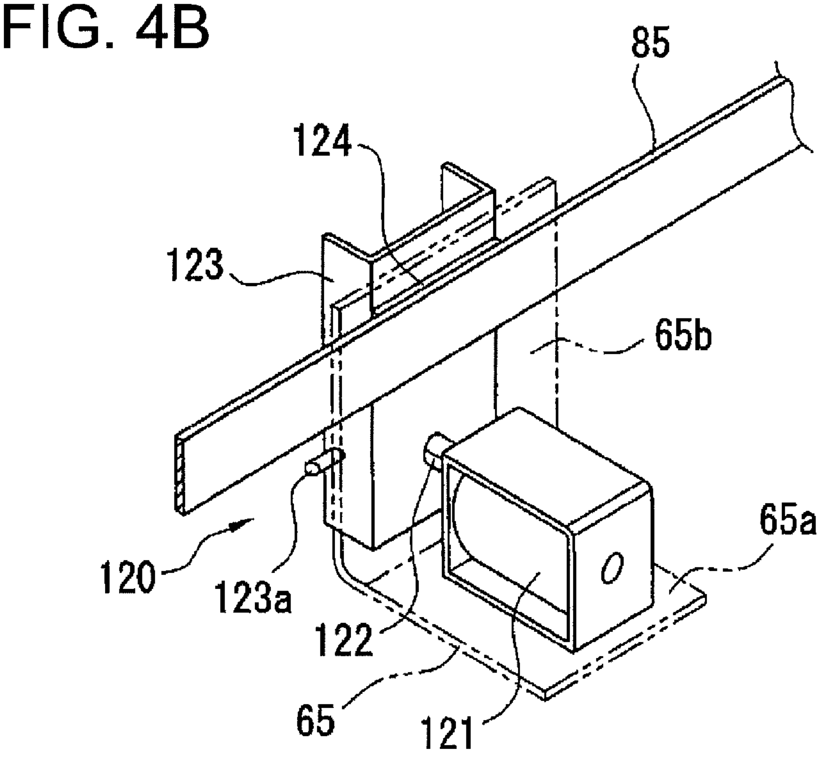

The connecting mechanisms 110, 120 have the same structure. The specific structure is shown in FIGS. 4A, 4B taking the printer head connecting mechanism 120 as an example. The printer head connecting mechanism 120 includes a solenoid driving device 121 mounted on a horizontal portion 65*a* extending horizontally of an L-like plate member 65 composing the carriage 61 of the printer head 60, a plunger 122 which projects forward from the front end of the solenoid driving device 121 and is moved in the anteroposterior direction (protracted or retracted in the axial direction) by the solenoid driving device 121, and a clamping plate 123 connected to the distal end of the plunger 122. The clamping plate 123 is located in front of a vertical portion 65*b* which extends vertically such that the driving belt 85 is positioned between the clamping plate 123 and the vertical portion 65*b*. The clamping plate 123 is provided with pivot pins which are formed to project rightward and leftward from right and left side ends of a middle portion in the vertical direction of the clamping plate 123, whereby the clamping plate 123 is pivotally supported in the anteroposterior direction relative to the carriage 61. The plunger 122 is connected to the lower portion of the clamping plate 123. The upper portion of the clamping plate 123 is arranged to face to the driving belt 85.

As the plunger 122 is pushed out by the solenoid driving device 121 as shown in FIG. 4B, the lower portion of the clamping plate 123 is pivotally moved forward about the pivot pins 123*a* and the upper portion of the clamping plate 123 is retracted backward so that the driving belt 85 is clamped between the clamping plate and the vertical portion 65*b*. As a result, the printer head 60 (and the carriage 61 to which the printer head 60 is attached) is connected to the driving belt 85. To reinforce this connection, an antislip member 124 is attached to a portion of the upper portion of the clamping plate 123. In case where the driving belt 85 is a synchronous belt having teeth, the antislip member 124 may be composed of a member having teeth which can mesh with the teeth of the driving belt 85. Alternatively, the antislip member 124 may be composed of a member having high coefficient of friction. On the other hand, as the plunger 122 is retracted by the solenoid driving device 121 as shown in FIG. 4A, the lower portion of the clamping plate 123 is pushed back and the upper portion is spaced apart from the driving belt 85, thereby releasing the clamping of the driving belt 85. As a result, the printer head connecting mechanism 120 is separated from the driving belt 85 and the printer head 60 is thus separated from the driving belt 85.

Figure 5A:
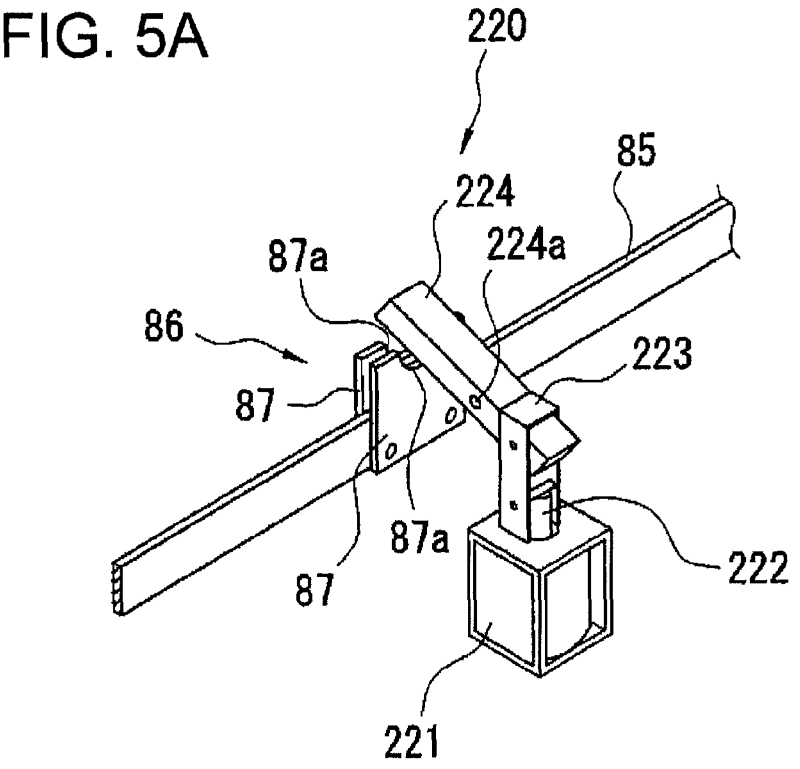
FIGS. 5A and 5B are perspective views showing a connecting mechanism of another embodiment for connecting the cutting head or the printer head and the driving belt in the printer-plotter.

Hereinafter, a printer head connecting mechanism 220 according to a second embodiment will be described with reference to FIGS. 5A, 5B. In case of this printer head connecting mechanism 220, the driving belt 85 is provided with a hook receiver 86 attached thereto. The hook receiver 86 is composed of two plate members 87, 87 which are connected to each other in a state sandwiching the driving belt 85 from the front and back and which are provided with engaging cutouts 87*a* formed in upper edges thereof, respectively. The printer head connecting mechanism includes a solenoid driving device 221 attached to the carriage 61 of the printer head 60, a vertical movable member 223 which projects upward from the upper end of the solenoid driving device 221 and is connected to a plunger 222 which is moved vertically by the solenoid driving device 221 so that the vertical movable member 223 is thus moved vertically, and a pivot hook member 224 connected to the vertical movable member 223.

The pivot hook member 224 is provided with a pivot hole 224*a* formed in its middle portion and is connected to the carriage 61 via a pin through the pivot hole 224*a*. Thus, the pivot hook member 224 is pivotally movable in the vertical direction about the pivot hole 224*a* and the distal end of the pivot hook member 224 can be engaged with the engaging cutouts 87*a* of the hook receiver. The rear end of the pivot hook member 224 is pivotally connected to an upper end portion of the vertical movable member 223. Therefore, as the plunger 222 is moved vertically by the solenoid driving device 221, the vertical movable member 223 is moved vertically together with the plunger 222 so that the pivot hook member 224 is pivotally moved vertically.

Figure 5B:
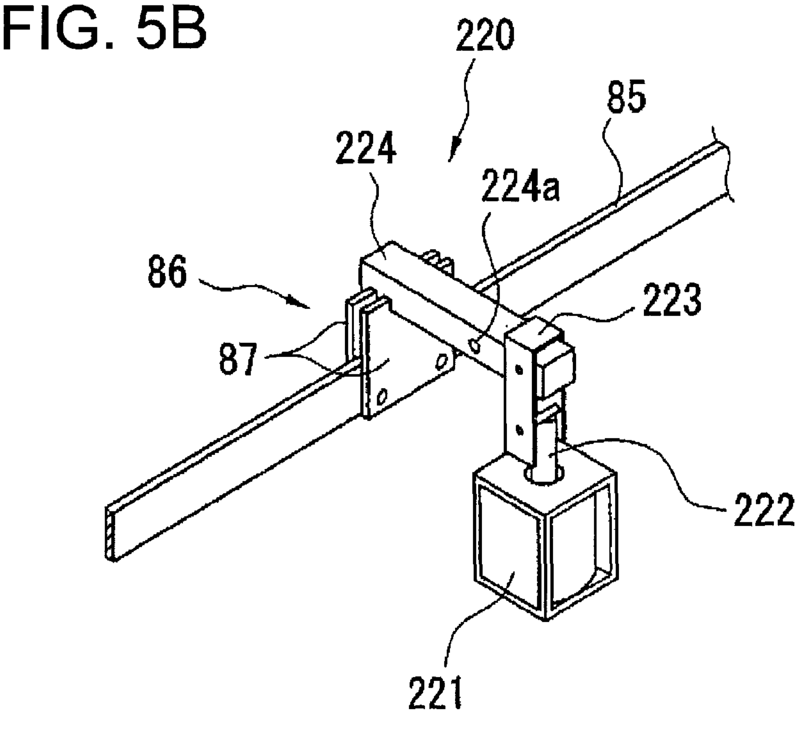

As the plunger 222 is pushed up by the solenoid driving device 221 as shown in FIG. 5B, the vertical movable member 223 is moved upward so that the rear end of the pivot hook member 224 is pushed up. Accordingly, the pivot hook member 224 is pivotally moved about the pivot hole 224*a* and the front end thereof enters into and is engaged with the engaging cutouts 87*a*. That is, by moving the plunger 222 upward by the solenoid driving device 221, the pivot hook member 224 is engaged with the hook receiver 86, whereby the printer head 60 is connected to the driving belt 85. On the other hand, as the plunger 222 is pushed down by the solenoid driving device 221 as shown in FIG. 5A, the vertical movable member 223 is moved downward so that the rear end of the pivot hook member 224 is pushed down. Accordingly, the pivot hook member 224 is pivotally moved about the pivot hole 224*a* and the front end thereof is separated from the engaging cutouts 87*a*. That is, by moving the plunger 222 downward by the solenoid driving device 221, the pivot hook member 224 is separated from the hook receiver 86, thereby releasing the connection between the printer head 60 and the driving belt 85.

Since the structure of the cutting head connecting mechanism 110 mounted on the cutting head 50 is the same as the structure of the printer head connecting mechanism 120, 220, the description about this will be omitted.

Figure 3:
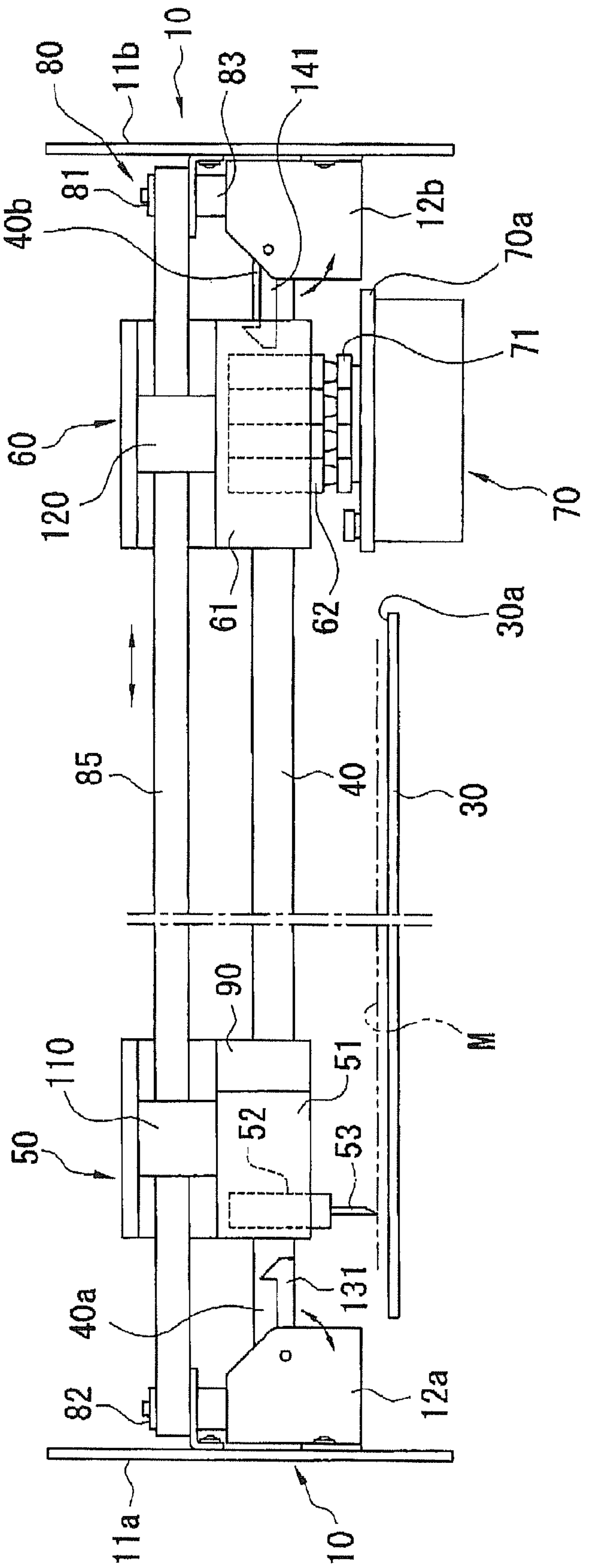
FIG. 3 is a front view showing the heads of the printer-plotter device and driving devices thereof.

In the printer-plotter P having the structure as aforementioned above, a left hook bracket 12*a* is fixed to the left sidewall 11*a* of the body 10 as shown in FIG. 3. The left hook bracket 12*a* is provided with a left-side hook 131 which is pivotally movable in the vertical direction by a built-in solenoid (not shown). On the other hand, the cutting head 50 is provided with an engaging portion which can be engaged with the left-side hook 131 when the cutting head 50 travels along the guide rail 40 and reaches the left end portion, but not shown. The left-side hook 131 is actuated by the built-in solenoid to engage with or disengage from the engaging portion when the cutting head 50 is positioned at the left end portion.

Similarly, a right hook bracket 12*b* is fixed to the right side wall 11*b* of the body 10 as shown in FIG. 3. The right hook bracket 12*b* is provided with a right-side hook 141 which can pivotally move in the vertical direction by a built-in solenoid (not shown). On the other hand, the printer head 60 is provided with an engaging portion which can be engaged with the right-side hook 141 when the printer head 60 travels along the guide rail 40 and reaches the right end portion, but not shown. The right-side hook 141 is actuated by the built-in solenoid to engage with or disengage from the engaging portion when the printer head 60 is positioned at the right end portion.

Hereinafter, the operation of conducting the cutting and printing processes relative to a sheet-like medium M using the printer-plotter P having the aforementioned structure.

For conducting the cutting process relative to the sheet-like medium M using the cutting head 50, prior to the process, the printer head 60 is connected to the driving belt 85 by the printer head connecting mechanism 120. In this state, the driving belt 85 is moved rightward by driving the electric motor 83 so as to move the printer head 50 rightward. At this point, the cutting head connecting mechanism 110 maintains the cutting head 50 apart from the driving belt 85. As the printer head 60 reaches the right end portion, the hook 141 is engaged with the hook receiving portion so that the printer head 60 is fixed and held at the right end. At the same time, the stage of the maintenance device 70 is automatically moved upward so that the ink ejection holes formed in the lower surface of the printer head module 62 are closed by the anti-drying member 71.

Then, the printer head 60 is separated from the driving belt 85 by the printer head connecting mechanism 120 and the cutting head 50 is connected to the driving belt 85 by the cutting head connecting mechanism 110. Then, the driving belt 85 is moved by the electric motor 83 to move the cutting head 50 connected to the driving belt 85 in the lateral direction along the guide rail 40. At the same time, the sheet-like medium M is moved in the anteroposterior direction by the feeding mechanism 20, whereby the cutter 53 is moved in the anteroposterior and lateral directions relative to the medium M to conduct the intended cutting process.

On the other hand, for conducting the printing process relative to the sheet-like medium M using the printer head 60, also prior to the process, the cutting head 50 is connected to the driving belt 85 by the cutting head connecting mechanism 110. In this state, the driving belt 85 is moved leftward by driving the electric motor 83 so as to move the cutting head 50 leftward. At this point, the printer head connecting mechanism 120 maintains the printer head 60 apart from the driving belt 85. As the cutting head 50 reaches the left end portion, the hook 131 is engaged with the hook receiving portion so that the cutting head 50 is fixed and held at the left end.

Then, the printer head 60 fixed and held at the right end is released from the engagement with the hook 141 and the cutting head 50 is separated from the driving belt 85 by the cutting head connecting mechanism 110. The printer head 60 is connected to the driving belt 85 by the printer head connecting mechanism 120, then, the driving belt 85 is moved by driving the electric motor 83 so as to move the printer head 60 connected to the driving belt 85 in the lateral direction along the guide rail 40 and ink droplets are ejected through the ink ejection holes formed in the lower surface of the printer head modules 62 onto the surface of the sheet-like medium M put on the platen 30, thereby conducting intended printing.

After completion of the predetermined cutting and the printing processes as mentioned above, the sheet-like medium M is cut out by a separation cutter (not shown) which is attached to the carriage 61 of the printer head 60 such that the separation cutter is movable in the vertical direction, thereby separating the sheet-like medium M into a printed portion and an unprinted portion. This action is achieved by moving the separation cutter downward to a position capable of touching the sheet-like medium M and sweeping the printer head 60 in a lateral direction.

According to the printer-plotter P as mentioned above, the head not required for the action relative to the sheet-like medium M is never moved along the guide rail 40. Therefore, the capacity of the electric motor 83 for driving the heads 50, 60 can be smaller, thereby achieving the cost reduction. Since the cutting head 50 is on standby in a state fixed at the left end portion 40*a* of the guide rail 40 during the printing process using the printer head 60, there is no chance that the cutting head 50 gets closer to the printer head 60 so that ink droplets ejected from the printer head 60 adhere never to the cutting head 50 and the cutting head 50 is thus never contaminated with the ink. Moreover, there is no chance that parts mounted on the cutting head 50 such as the covers of harnesses or the like are dissolved due to the adhesion of the ink. Therefore, the requirement for selecting a material having ink resistance to produce these parts can be eliminated, thereby achieving both elimination of operation error and reduction of cost.

Though the printer-plotter according to the present invention has been described with the aforementioned embodiments, the scope of the present invention is not limited to the aforementioned structures. As will be described below, the combination of two head supported by the guide rail 40, the structure of the head driving device 80, the structure of the cutting head and printer head connecting mechanisms 110, 120, the structure for moving the heads 50, 60 in the anteroposterior direction and the lateral direction relative to the sheet-like medium M may be suitably modified. In the following description, the same components as those of the aforementioned structural examples will be marked by the same numerals so as to omit redundant description.

The combination of heads may be a combination of two printer heads for ejecting ink droplets of different compositions or different colors, for example, an aqueous printer head for ejecting aqueous ink droplets and a solvent printer head for ejecting solvent ink droplets.

In this variation example, while one of the heads is used to conduct printing, the other head is positioned at an end of the guide rail 40 and is on standby in a state where the ink ejection holes are closed. Therefore, the capacity of the electric motor 83 for can be smaller and there is no chance that ink droplets ejected from one of the printer heads adhere to the other printer head. It should be noted that each conventional apparatus is provided with only one printer head even when printing with inks of different properties such as aqueous ink and solvent ink is needed because it is impossible to share tubes and a maintenance device. In this structural example, since two printer heads can be mounted, reduction in installation space and cost can be achieved as compared to the case where separate printer-plotters should be installed according to the ink compositions.

In this variation example, the combination of inks to be ejected from two printer heads is not limited to the combination of aqueous ink and solvent ink. One of the heads may eject UV curable ink. In this case, a light source device such as a halogen lamp for irradiating ultraviolet light to the sheet-like medium M is attached to one of the right and left side walls of the carriage of the printer head via a bracket.

Instead of the cutting head 50, a preprocessing head or a post-processing head may be provided. The preprocessing head is a head for conducting pretreatment for obtaining excellent printing result by ejecting a predetermined processing liquid relative to a sheet-like medium M such as fabric prior to the printing to ensure the permeability and fix level similar to the level of a sheet-like medium M which is manufactured for printing purpose. The post-processing head is a head for conducting coating process on a printed surface by ejecting a predetermined processing liquid relative to a sheet-like medium M after printing to improve the rub resistance and weatherability. The carriage of each head is provided with a spraying device having nozzles for ejecting the processing liquid such that the nozzles are arranged to face to the supporting surface 30*a* in the vertical direction. To use the head for the processing, the head is connected to the driving belt 85, the printer head 60 is connected to the body 10, and the ink ejection holes 62*a* are closed. By ejecting the processing liquid from the nozzles while moving the nozzles in the anteroposterior and lateral directions relative to the sheet-like medium M, whereby the processing liquid is sprayed on a predetermined area of the sheet-like medium M.

In this variation example, since treatment before or after the printing can be conducted in addition to the function as an inkjet printer, reduction in installation space and cost can be achieved as compared to a case where a separate apparatus capable of conducting such treatment is installed. Moreover, the treatment and the printing can be successively conducted automatically singly by this apparatus, thereby leading to significant laborsaving.

Instead of the cutting head 50, a scanner head for reading images and characters recorded or printed on a sheet-like medium M may be provided. The carriage of the scanner head is provided with a scanner on which an image sensor having optical conversion elements is mounted for reading images and characters. To use the scanner head for the image reading, the carriage of the scanner head is connected to the driving belt 85, the printer head is connected to the body 10, and the ink ejection holes are closed. By repeating an action of feeding the sheet-like medium forward a predetermined length by the feeding mechanism 20 and an action of reading an image or the like per a predetermined pixel width by the image sensor while moving the carriage of the scanner head once in the lateral direction, the image or the like in the predetermined area of the sheet-like medium can be read out.

The data of the image thus read out can be used to conduct printing using the printer head. Alternatively, the scanner head may be used to read out image relative to a portion printed by the printer head. Then, the data for printing and the data of the image read out are compared to check the printing accuracy. Further, the result of checking of the printing accuracy may be displayed on an operation panel to prompt a user to carry out suitable maintenance operation.

In the variation example, the action of reading image or the like and the action of printing can be successively conducted automatically singly by this apparatus, thereby leading to significant laborsaving as compared to a case that a scanner and a printer are separately placed or a case that a scanner is structured as a cartridge type which can be replaced with a head module.

Further, a writing thing such as a pen may be held by the cutter holder 52 of the cutting head 50 in any of the aforementioned structural example. In this case, the printer has a function as a pen plotter. The cutter and the writing thing may be detachably attached to the cutter holder 52. Alternatively, one of the heads is a printer head and the other head is structured such that two or more of the followings, that is, a cutter holder 52, a spraying device for ejecting processing liquid, and a scanner may be detachably attached to the carriage. Therefore, it is possible to provide a printer-plotter having multiple functions. In any of the structural examples, the locations of the heads in the lateral direction may be exchange. Also in this case, the same effects can be obtained. If the printer head is located at a left side, the maintenance device 70 is positioned below a left end portion of the guide rail 40.

The head driving device 80 may be of any structure capable of transmitting driving force to the carriage supported by the guide rail 40 for moving along the guide rail in the lateral direction. For example, the head driving device 80 includes a pair of right and left pulleys each having a groove which is formed in the outer periphery to extend in the circumferential direction and a steel wire which is wound around the pulleys to extend therebetween with some tension not to slip.

Figure 6:
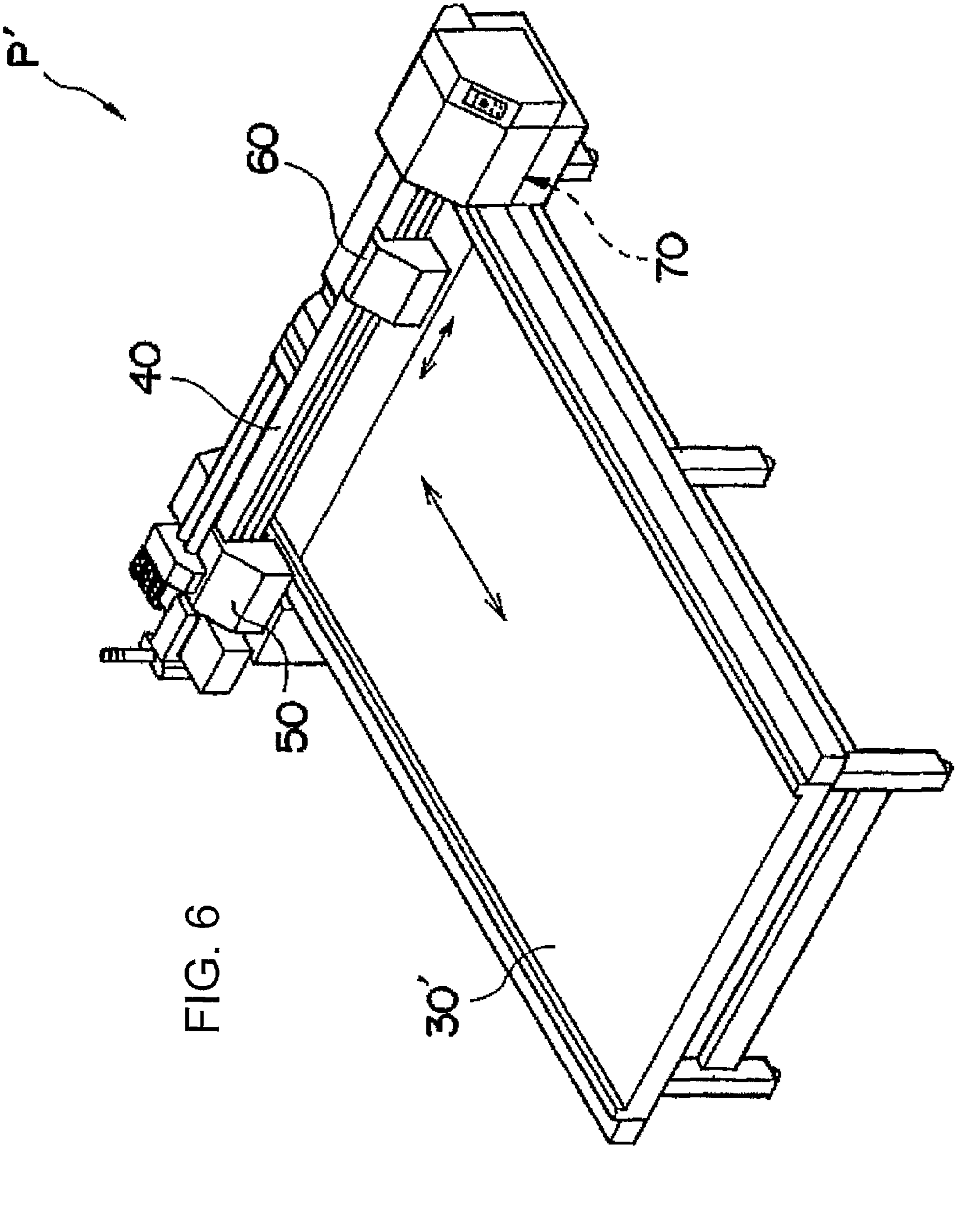
FIG. 6 is a perspective view showing a variation example of the printer-plotter.

The arrangement for moving the head in the anteroposterior and lateral directions relative to the sheet-like medium may be an arrangement, as shown in FIG. 6, including a supporting table 30' which is fixed to a floor and supports a sheet-like medium placed thereon and a guide rail 40 which is disposed above the supporting table 30' to extend in the width direction, wherein the guide rail 40 is movable in the longitudinal direction of the supporting table 30' and the heads 50, 60 are movable in the anteroposterior and lateral directions relative to the sheet-like medium put on the supporting table 30'. This arrangement enables to handle a medium having large thickness. Alternatively, the guide rail may be fixed to the longitudinal direction of the supporting table and the supporting table may be movable in the longitudinal direction. This arrangement enables to handle a fabric as a sheet-like medium.

According to the printer-plotter according to the embodiments of the present invention, for example, as the driving force transmitting member is moved in the lateral direction by the driving mechanism when the first head is connected to the driving force transmitting member by the first connecting mechanism and the second head is separated from the driving force transmitting member by the second connecting mechanism, the first head is allowed to conduct the predetermined action (cutting process or printing) relative to the sheet-like medium while moving the first head in the lateral direction. During this, the second head is on standby in a state supported by the guide rail. On the other hand, the first head can be separated to be on standby and the second head can be connected to the driving force transmitting member to conduct the predetermined action while moving in the lateral direction. As mentioned above, since the printer-plotter is structured such that the first and second heads are moved separately to conduct the respective actions relative to the sheet-like medium, the driving force required for the driving mechanism can be small and the driving device can be configured to be small and light, thereby achieving reduction in size, weight, and cost of the entire apparatus.

When said first head connected to said driving force transmitting member is moved in the lateral direction by moving said driving force transmitting member in the lateral direction by said driving mechanism, said second head separated from said driving force transmitting member is fixed and held by said second head fixing mechanism. When said second head connected to said driving force transmitting member is moved in the lateral direction by moving said driving force transmitting member in the lateral direction by said driving mechanism, said first head separated from said driving force transmitting member is fixed and held by said first head fixing mechanism. This arrangement is preferable because the second head is fixed and held at the end of the guide rail and thus never disturbs the action of the first head when the first head is moved in the lateral direction along the guide rail to conduct the predetermined action, and on the other hand, the first head is fixed and held at the end of the guide rail and thus never disturbs the action of the second head when the second head is moved along the guide rail in the lateral direction to conduct the predetermined action.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A printer-plotter comprising:

a guide rail extending in a longitudinal direction;

a first head supported by the guide rail and movable along the longitudinal direction;

a second head supported by the guide rail and movable independently of the first head along the longitudinal direction;

a driving device comprising a driving force transmitting member and a driving mechanism configured to move the driving force transmitting member;

a first connecting mechanism configured to detachably connect the first head to the driving force transmitting member; and a second connecting mechanism configured to detachably connect the second head to the driving force transmitting member.

2. The printer-plotter according to claim 1, further comprising:

a first head holding mechanism configured to hold the first head at a first end of the guide rail; and a second head holding mechanism configured to hold the second head at a second end opposite to the first end along the longitudinal direction of the guide rail, wherein when said first head connected to said driving force transmitting member is moved in the lateral direction by moving said driving force transmitting member in the lateral direction by said driving mechanism, said second head separated from said driving force transmitting member is fixed and held by said second head fixing mechanism, and wherein when said second head connected to said driving force transmitting member is moved in the lateral direction by moving said driving force transmitting member in the lateral direction by said driving mechanism, said first head separated from said driving force transmitting member is fixed and held by said first head fixing mechanism.

3. The printer-plotter according to claim 1, wherein the driving mechanism comprises a first pulley disposed at a first end along the longitudinal direction of the guide rail, a second pulley disposed at a second end opposite to the first end along the longitudinal direction of the guide rail, and a driving motor configured to rotate either one of the first and second pulleys, the driving force transmitting member comprising a driving belt which is wound around the first and second pulleys to extend along the longitudinal direction.

4. The printer-plotter according to claim 1, wherein the printer-plotter comprises a feeding mechanism configured to feed a sheet medium along a feeding direction substantially perpendicular to the longitudinal direction.

5. The printer-plotter according to claim 4, wherein the first head comprises a cutting head configured to cut the medium, and wherein the second head comprises a printer head configured to print on the medium.

6. The printer-plotter according to claim 4, wherein the first head and the said second head comprise printer heads configured to print on the medium.

7. The printer-plotter according to claim 5, further comprising:

a spray unit provided at the cutting head to form a coating layer on a surface of the medium.

8. The printer-plotter according to claim 1, wherein the printer-plotter comprises a controller configured to control the first head, the second head, the driving device, the first connecting mechanism and the second connecting mechanism so that the second head is not connected to the driving force transmitting member and the first head is connected to the driving force transmitting member via the first connecting mechanism when the first head operates and so that the first head is not connected to the driving force transmitting member and the second head is connected to the driving force transmitting member via the second connecting mechanism when the second head operates.

9. The printer-plotter according to claim 1, wherein the first and the second connecting mechanisms are electronically controlled to detachably connect the first and the second heads to the driving force transmitting member.

10. The printer-plotter according to claim 9, wherein the first and the second connecting mechanisms comprises a solenoid device, respectively.

11. The printer-plotter according to claim 1, wherein the first connecting mechanism is configured to detachably connect the first head directly to the driving force transmitting member, and wherein the second connecting mechanism is configured to detachably connect the second head directly to the driving force transmitting member.

12. The printer-plotter according to claim 1, wherein one of the first head and the second head comprises a cutting head configured to cut the medium, and further comprising a spray unit provided at the cutting head to form a coating layer on a surface of the medium.

* * * * *